(12) United States Patent
Hiramoto et al.

(10) Patent No.: US 8,537,256 B2
(45) Date of Patent: Sep. 17, 2013

(54) IMAGE PICKUP DEVICE AND SOLID-STATE IMAGE PICKUP ELEMENT

(75) Inventors: Masao Hiramoto, Osaka (JP);
Masayuki Misaki, Hyogo (JP);
Teruyuki Takizawa, Osaka (JP);
Masaaki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 123 days.

(21) Appl. No.: 13/142,021

(22) PCT Filed: Oct. 4, 2010

(86) PCT No.: PCT/JP2010/005936
§ 371 (c)(1),
(2), (4) Date: Jun. 24, 2011

(87) PCT Pub. No.: WO2011/043051
PCT Pub. Date: Apr. 14, 2011

(65) Prior Publication Data
US 2011/0254985 A1 Oct. 20, 2011

(30) Foreign Application Priority Data
Oct. 7, 2009 (JP) .................................. 2009-233287

(51) Int. Cl.
*H04N 9/083* (2006.01)
(52) U.S. Cl.
USPC .......................................... 348/275; 348/290
(58) Field of Classification Search
USPC ........................... 348/267, 270–281, 290, 302
See application file for complete search history.

(56) References Cited

U.S. PATENT DOCUMENTS

| | | | | |
|---|---|---|---|---|
| 4,907,074 A | * | 3/1990 | Hashimoto | 348/237 |
| 6,678,000 B1 | * | 1/2004 | Sakata | 348/369 |

(Continued)

FOREIGN PATENT DOCUMENTS

| | | |
|---|---|---|
| JP | 58-137247 A | 8/1983 |
| JP | 60-187187 A | 9/1985 |

(Continued)

OTHER PUBLICATIONS

International Search Report for corresponding International Application No. PCT/JP2010/005936 mailed Nov. 16, 2010.

*Primary Examiner* — Lin Ye
*Assistant Examiner* — Euel Cowan
(74) *Attorney, Agent, or Firm* — Renner, Otto, Boisselle & Sklar, LLP

(57) ABSTRACT

The solid-state image sensor of this invention includes an array of pixels and light-transmitting portions 30*a*, 30*b*, 30*c*, 30*d*. The array is divided into unit pixel blocks, each of which is made up of N pixels (where N is an integer that is equal to or greater than two). The light-transmitting portions are arranged so that each light-transmitting portion faces an associated one of the pixels. Each of the light-transmitting portions is divided into M striped areas (where M is an integer that is equal to or greater than two). The respective areas have had their optical transmittances set independently of each other. The arrangement pattern of the optical transmittances of the light-transmitting portions 30*a*, 30*b*, 30*c*, 30*d* vary from one block to another. The image capture device of the invention further includes a shifting section for shifting the image in a first direction on an imaging area, and reads pixel signals before and after the image is shifted, thereby generating an image, of which the resolution is higher than what is defined by the pixel pitch.

8 Claims, 7 Drawing Sheets

(56) References Cited

U.S. PATENT DOCUMENTS

| | | | |
|---|---|---|---|
| 2004/0201760 A1* | 10/2004 | Ota et al. | 348/272 |
| 2008/0007636 A1* | 1/2008 | Cernasov | 348/273 |
| 2009/0097136 A1* | 4/2009 | Otsu | 359/739 |
| 2009/0127430 A1 | 5/2009 | Hirasawa et al. | |

FOREIGN PATENT DOCUMENTS

| | | |
|---|---|---|
| JP | 63-284979 A | 11/1988 |
| JP | 64-069160 A | 3/1989 |
| JP | 09-214988 A | 8/1997 |
| JP | 2009-010847 A | 1/2009 |
| JP | 2009-225454 A | 10/2009 |

\* cited by examiner

IMAGE PICKUP DEVICE AND SOLID-STATE IMAGE PICKUP ELEMENT

TECHNICAL FIELD

The present invention relates to an image capture device and solid-state image sensor that can increase the resolution of an image to a subpixel precision.

BACKGROUND ART

Recently, the performance and functionality of digital cameras and digital movie cameras that use some solid-state image sensor such as a CCD and a CMOS (which will be simply referred to herein as an "image sensor") have been enhanced to an astonishing degree. In particular, the size of a pixel structure for use in a solid-state image sensor has been further reduced these days thanks to development of semiconductor device processing technologies, thus getting an even greater number of pixels and drivers integrated together in a solid-state image sensor. As a result, the resolution of an image sensor has lately increased rapidly from one million pixels to ten million pixels in a matter of few years. Meanwhile, the higher the density of pixels in an image sensor with such a high resolution, the more complicated its manufacturing process has got to be and the lower the quality of the product should be. On top of that, as it takes a longer time to check out its image quality, the yield and productivity have been affected as well.

The resolution of an image can be increased by not just simply increasing the number of pixels of an image sensor but also shifting the pixels of the image sensor with respect to the image that has been captured by an optical system (which is a so-called "pixel shifting technology"). The pixel shifting technology may be roughly classified into two types. The first type of the pixel shifting technology is spatial shifting, in which the spatial shift is done by arranging a number of pixels in columns and rows on an imaging area of a solid-state image sensor in a shifted pattern so that each row or column of pixels is shifted from its adjacent ones by a half-pixel pitch. On the other hand, the second type of the pixel shifting technology is temporal shifting, in which the temporal shift is done by subtly moving mechanically at least one of a solid-state image sensor with a two-dimensional tetragonal arrangement and the optical system.

An exemplary fundamental principle for making such spatial pixel shifting by slightly changing the spatial positional of an image is disclosed in Patent Document No. 1, in which such a technique for making pixel shifting with the spatial position of the image changed slightly is applied to a three-panel color camera that uses three image sensors. That color camera adopts an arrangement in which image sensor pixels, representing the color green (G) that will achieve high luminous efficacy to the viewer's eyes, are arranged every other row so as to be horizontally shifted from each other by a half pitch, thereby increasing the resolution in the horizontal direction.

Meanwhile, an arrangement in which pixels are shifted not just horizontally but also vertically is disclosed in Patent Document No. 2. Specifically, in the CCD image sensor disclosed in Patent Document No. 2, photosensitive sections associated with the respective pixels have a diamond shape and are arranged in a winding pattern. By arranging the pixels so that they are shifted from each other by a half pixel pitch both horizontally and vertically, the resolution can be increased horizontally and vertically.

As for the temporal pixel shifting technique, an example in which the optical system is subtly moved mechanically with respect to the image sensor is disclosed in Patent Document No. 3, in which a light-transmissive parallel plate is arranged between the image sensor and a lens. By shaking the parallel plate with respect to the optical axis, the optical image produced on the image sensor is moved subtly, thereby increasing the resolution in the direction in which the image is moved subtly. Conversely, a technique for increasing the resolution by moving the image sensor itself subtly instead of the optical system is disclosed in Patent Document No. 4, in which a piezoelectric element is used as a means for moving the image sensor subtly by a half pixel pitch, thereby attempting to increase the resolution.

As described above, according to these conventional pixel shifting techniques, pixels are arranged so as to be shifted from each other by a half pixel pitch both horizontally and vertically or the image sensor is moved subtly by a half pixel pitch both horizontally and vertically, thereby attempting to increase the resolution. Theoretically speaking, if the photosensitive section had an aperture ratio of 100%, the resolution should be doubled by shifting the pixels by a half pitch.

CITATION LIST

Patent Literature

Patent Document No. 1: Japanese Patent Application Laid-Open Publication No. 58-137247
Patent Document No. 2: Japanese Patent Application Laid-Open Publication No. 60-187187
Patent Document No. 3: Japanese Patent Application Laid-Open Publication No. 63-284979
Patent Document No. 4: Japanese Patent Application Laid-Open Publication No. 64-69160

SUMMARY OF INVENTION

Technical Problem

According to these conventional pixel shifting techniques, the resolution can be certainly roughly doubled but not more than that. To further increase the resolution, there has been no choice but to arrange the pixels more densely.

It is therefore an object of the present invention to provide a pixel shifting technique that can more than double the resolution even without increasing the density of pixels arranged, which has never been done by any conventional pixel shifting technique so far.

Solution to Problem

An image capture device according to the present invention includes a solid-state image sensor with an array of pixels and a number of light-transmitting portions. The array is made up of a number of pixels that are arranged two-dimensionally on an imaging area in a first direction and in a second direction that intersects with the first direction. The array is divided into a number of unit pixel blocks, each of which is made up of N pixels (where N is an integer that is equal to or greater than two). Each light-transmitting portion is provided for an associated one of the pixels and is divided into M areas (where M is an integer that is equal to or greater than two and) that are arranged in the first direction. The respective areas have had their optical transmittances set independently of each other. And the arrangement pattern of the optical transmittances of N light-transmitting portions that are provided for N pixels included in each unit pixel block varies from one block to another. The image capture device further includes: an optical system for producing an image on the imaging area of the solid-state image sensor; a shifting section for changing the relative position of the image with respect to the light-transmitting portions in at least one of the first and second directions; and a signal processing section for generating an image, of which the resolution is higher than the resolution that is defined by a pixel pitch of the array of pixels in the first direction, based on the output signals of respective pixels of the solid-state image sensor.

In one preferred embodiment, the optical system includes an optical low-pass filter for decreasing, in the second direction, the resolution of the image to be produced by the optical system, and the shifting section changes the relative position of the image with respect to the light-transmitting portions in the first direction.

In another preferred embodiment, the arrangement pattern of the optical transmittances of the N light-transmitting portions that are provided for the N pixels included in each said unit pixel block is determined by an orthogonal wavelet coefficient.

In still another preferred embodiment, the optical system includes a light-transmissive member, one surface of which is tilted with respect to a plane that intersects with the optical axis at right angles, and the shifting section changes the relative position of the image with respect to the light-transmitting portions by moving the light-transmissive member perpendicularly to the optical axis.

In yet another preferred embodiment, at least all but one of the N light-transmitting portions, which are provided for the N pixels included in each said unit pixel block, have had their optical transmittances set to be either a first transmittance or a second transmittance that is different from the first transmittance.

In this particular preferred embodiment, N=4 and M=4. And if the first and second transmittances are represented by "1" and "−1", respectively, the arrangement pattern of the optical transmittances of four light-transmitting portions that are provided for four pixels included in each unit pixel block is selected from the group consisting of a first pattern represented by "1, −1, 1, −1" and a contrary pattern thereof, a second pattern represented by "−1, 1, 1, −1" and a contrary pattern thereof, a third pattern represented by "−1, −1, 1, 1" and a contrary pattern thereof, and a fourth pattern in which the optical transmittances of respective areas are set to be a third transmittance that is greater than zero.

In an alternative preferred embodiment, N=4 and M=4. And if the first and second transmittances are represented by "1" and "−1", respectively, the arrangement pattern of the optical transmittances of four light-transmitting portions that are provided for four pixels included in each unit pixel block is selected from the group consisting of a first pattern represented by "1, −1, 1, −1", a second pattern represented by "−1, 1, 1, −1" and a contrary pattern thereof, a third pattern represented by "−1, −1, 1, 1" and a contrary pattern thereof, and a contrary pattern of the first pattern.

A solid-state image sensor according to the present invention includes an array of pixels and a number of light-transmitting portions. The array is made up of a number of pixels that are arranged two-dimensionally on an imaging area in a first direction and in a second direction that intersects with the first direction. And the array is divided into a number of unit pixel blocks, each of which is made up of N pixels (where N is an integer that is equal to or greater than two. Each of the light-transmitting portions is provided for an associated one of the pixels and divided into M areas (where M is an integer that is equal to or greater than N and) that are arranged in the first direction. The respective areas have had their optical transmittances set independently of each other. And the arrangement pattern of the optical transmittances of N light-transmitting portions that are provided for N pixels included in each unit pixel block vary from one block to another.

Advantageous Effects Of Invention

The image capture device and solid-state image sensor of the present invention can obtain a pixel signal with at least a subpixel precision, and therefore, can achieve a higher resolution than what is achieved by a conventional pixel shifting technique.

Figure 4:
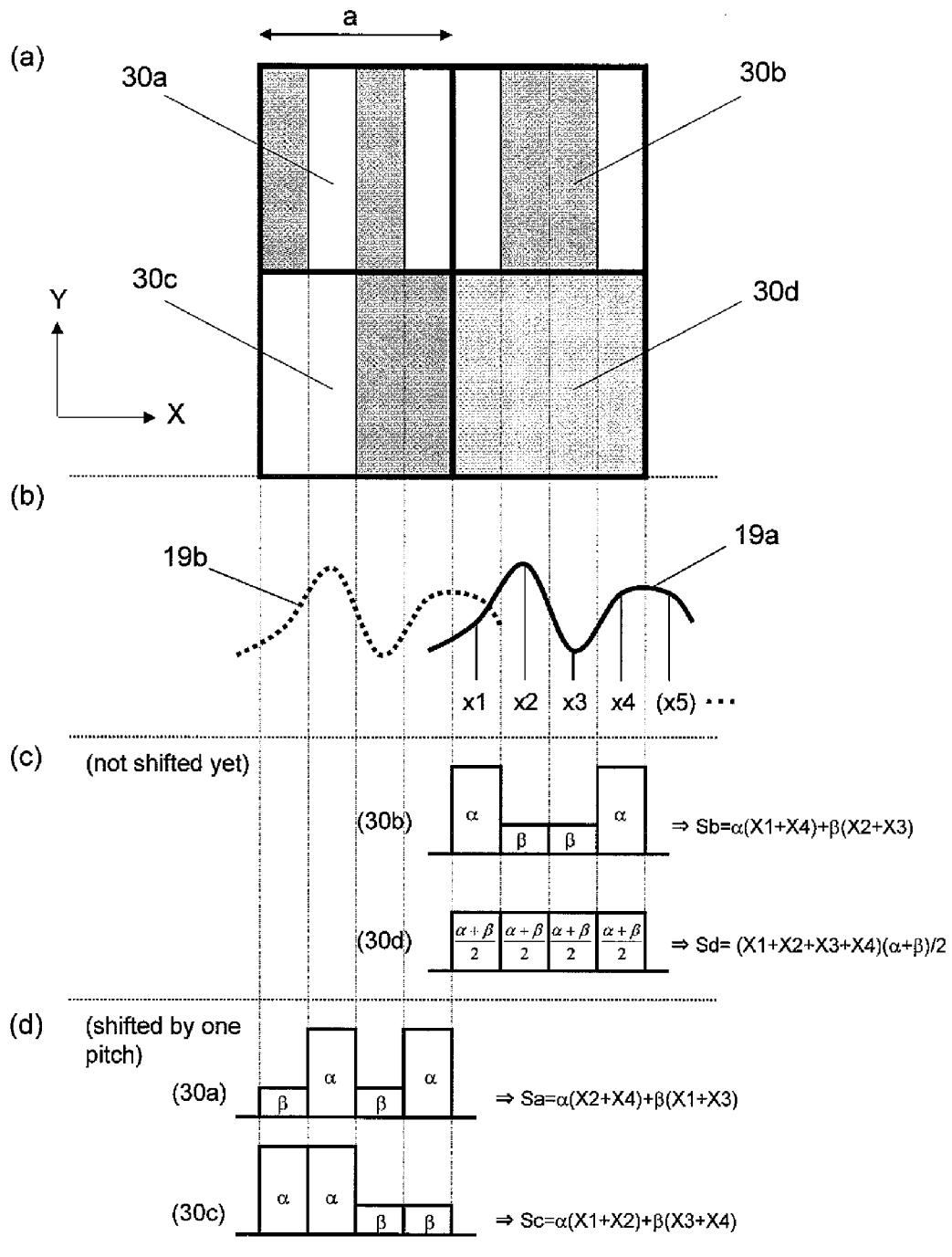

Portion (a) of FIG. 4 illustrates a basic arrangement for ND filters in a solid-state image sensor according to the first preferred embodiment of the present invention; portion (b) of FIG. 4 shows how the signal distribution changes before and after the image is shifted; portion (c) of FIG. 4 shows the optical transmittances of pixels 30b and 30d and their associated pixel signals; and portion (d) of FIG. 4 shows the optical transmittances of pixels 30a and 30c and their associated pixel signals.

Figure 5:
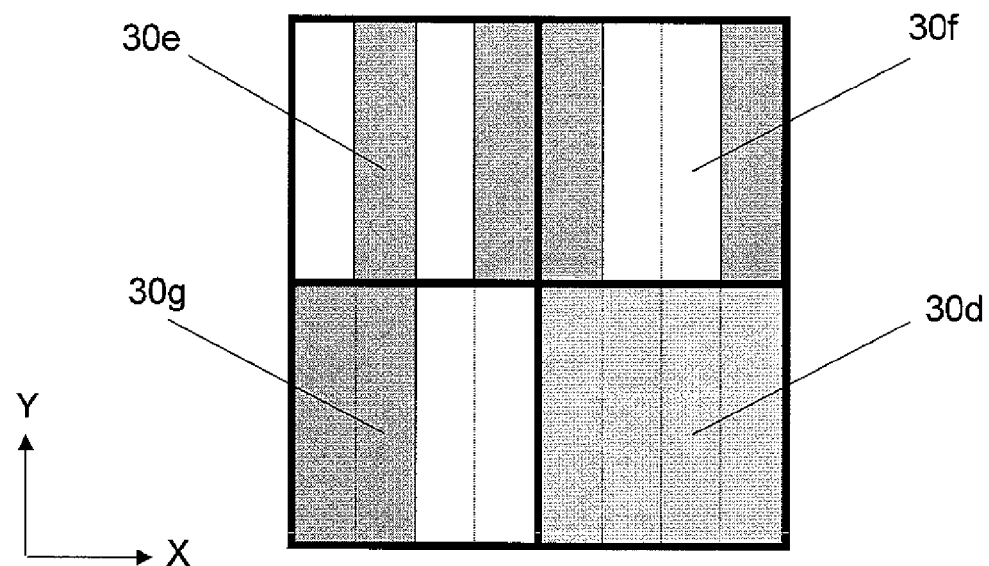

FIG. 5 illustrates another basic arrangement for ND filters in a solid-state image sensor according to the first preferred embodiment of the present invention.

Figure 6:
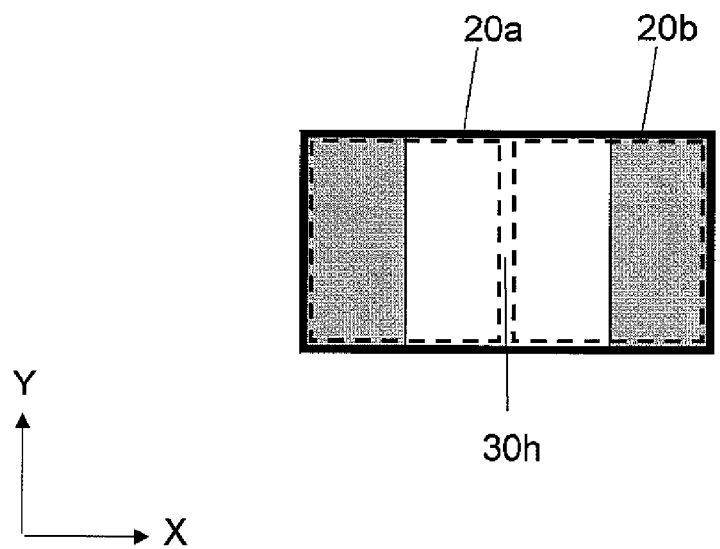

FIG. 6 illustrates still another basic arrangement for ND filters in a solid-state image sensor according to the first preferred embodiment of the present invention.

Figure 7:
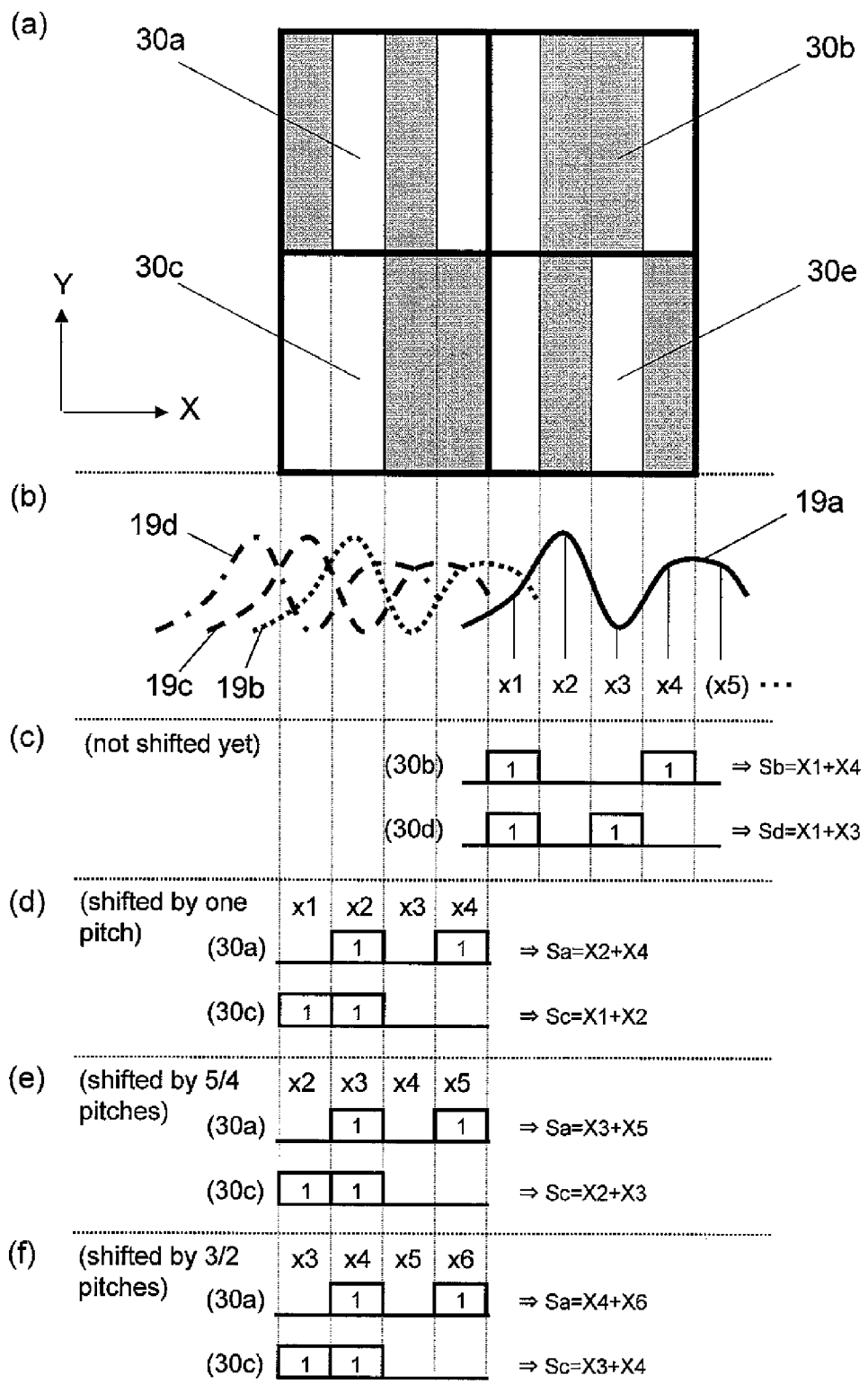

Portion (a) of FIG. 7 illustrates a basic arrangement for ND filters in a solid-state image sensor according to a second preferred embodiment of the present invention; portion (b) of FIG. 7 shows how the signal distribution changes before and after the image is shifted; portion (c) of FIG. 7 shows the optical transmittances of pixels 30b and 30e and their associated pixel signals; portion (d) of FIG. 7 shows the optical transmittances of pixels 30a and 30c at a point in time when the image is shifted horizontally by one pitch and their associated pixel signals; portion (e) of FIG. 7 shows the optical transmittances of the pixels 30a and 30c at a point in time when the image is shifted horizontally by 5⁄4 pitches and their associated pixel signals; and portion (f) of FIG. 7 shows the optical transmittances of the pixels 30a and 30c at a point in time when the image is shifted horizontally by 3⁄2 pitches and their associated pixel signals.

Figure 8:
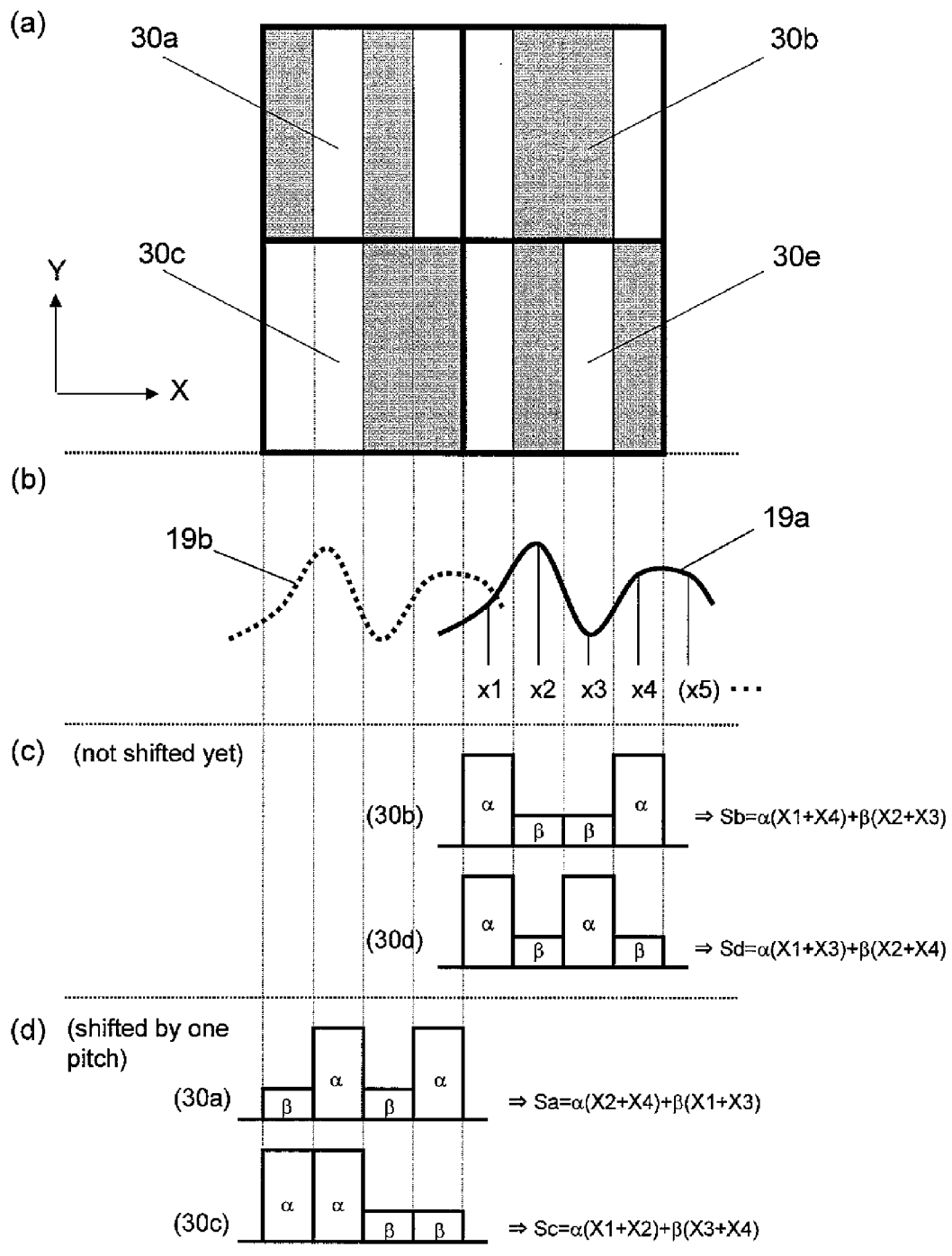

Portion (a) of FIG. 8 illustrates a basic arrangement for ND filters in a solid-state image sensor according to a fourth preferred embodiment of the present invention; portion (b) of FIG. 8 shows how the signal distribution changes before and after the image is shifted; portion (c) of FIG. 8 shows the optical transmittances of pixels 30b and 30e and their associated pixel signals; and portion (d) of FIG. 8 shows the optical transmittances of pixels 30a and 30c and their associated pixel signals.

Figure 9A:
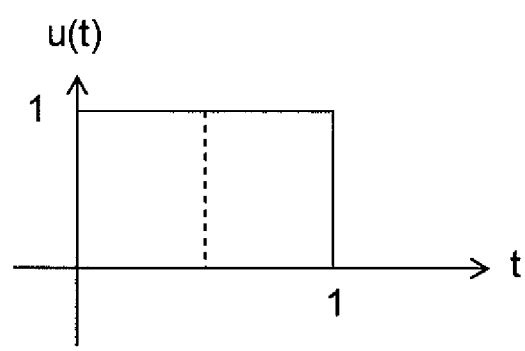
Figure 9B:
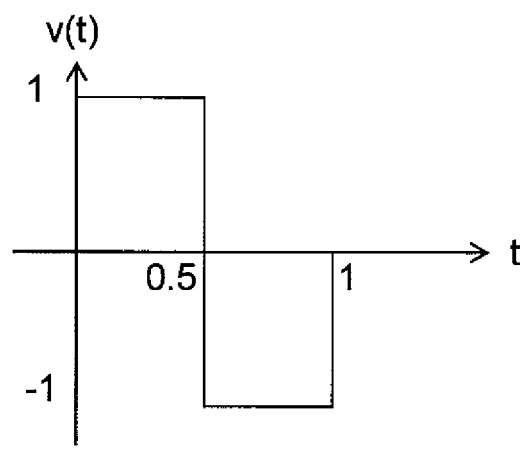

FIG. 9A is a graph showing a Haar base scaling function.
FIG. 9B is a graph showing a Haar base wavelet function.

DESCRIPTION OF EMBODIMENTS

Hereinafter, preferred embodiments of the present invention will be described with reference to the accompanying drawings. In the following description, any pair of components shown in multiple drawings and having substantially the same function will be identified by the same reference numeral.

(Embodiment 1)

Figure 1:
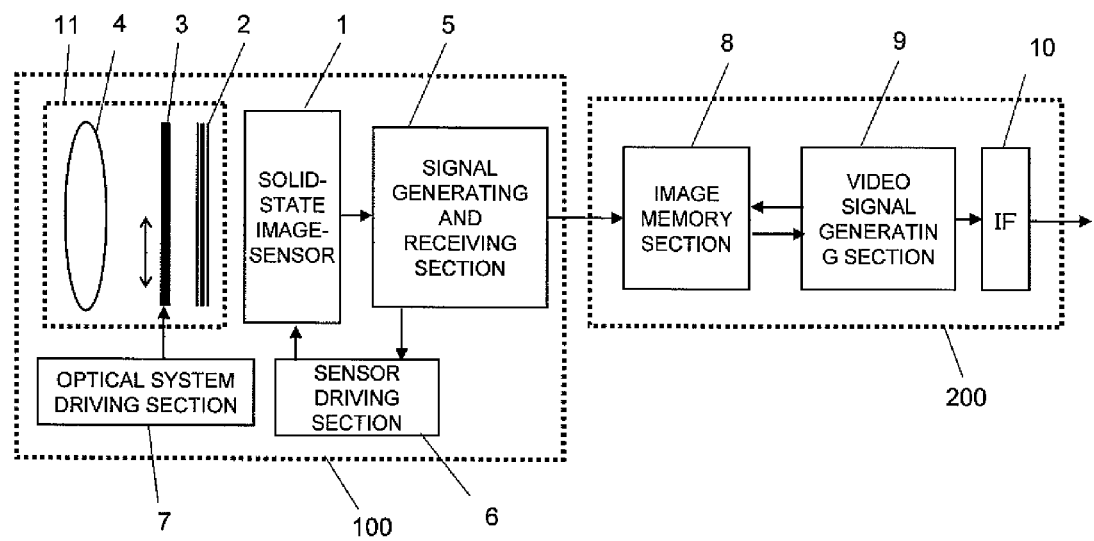
FIG. 1 is a block diagram illustrating an overall configuration for an image capture device as a first preferred embodiment of the present invention.

FIG. 1 is a block diagram illustrating an overall configuration for an image capture device as a first preferred embodiment of the present invention. The Image Capture Device of this preferred embodiment is a digital camcorder and includes an image capturing section 100 and a video signal processing section 200 that generates an image signal (such as a video signal) based on the signal supplied from the image capturing section 100. In this preferred embodiment, the image capture device is implemented as a camcorder. However, the image capture device may also be a camera that generates only a still picture.

The image capturing section 100 includes an optical system 11 and a solid-state image sensor 1 (which will be simply referred to herein as an "image sensor") for converting optical information that has been obtained by the optical system 11 into an electrical signal by photoelectric conversion. The optical system 11 includes an optical lens 4, an optical low-pass filter 2 made of a quartz crystal, and a transparent glass plate 3, of which the thickness varies according to the distance from its end. The transparent glass plate 3 is arranged so as to get moved slightly perpendicularly to the optical axis by an optical system driving section 7. The image capturing section 100 further includes a signal generating and receiving section 5, which not only generates a fundamental signal to drive this solid-state image sensor 1 but also receives the output signal of the solid-state image sensor 1 and sends it to the signal processing section 10, and a sensor driving section 6 for driving the image sensor 1 based on the fundamental signal generated by the signal generating and receiving section 5. Optionally, the sensor driving section 6 may form an integral part of the signal generating and receiving section 5.

The optical lens 4 is a known lens and may be a lens unit including multiple lenses. The optical low-pass filter 2 is an optical element for reducing a moiré pattern to be caused by a pixel arrangement. The image sensor 1 is typically a CCD or CMOS sensor, and may be fabricated by known semiconductor device processing technologies. The signal generating and receiving section 5 and the sensor driving section 6 may be implemented as an LSI such as a CCD driver. And the optical system driving section 7 may be a known piezoelectric element, for example.

The video signal processing section 200 includes a video signal generating section 9 for generating a video signal by processing the signal supplied from the image capturing section 100, an image memory section 8 for storing various kinds of data that have been produced while the video signal is being generated, and a video interface section 10 for sending out the video signal thus generated to an external device. The video signal generating section 9 is preferably a combination of a hardware component such as a known digital signal processor (DSP) and a software program for use to perform image processing involving the video signal generation.

According to this preferred embodiment, the video signal generating section 9 and the image memory section 8 are included in the signal processing section of the present invention. The image memory section 8 may be a DRAM, for example. And the image memory section 8 not only stores the signal supplied from the image capturing section 100 but also temporarily retains the image data that has been generated by the video signal generating section 9 or compressed image data. These image data are then output to either a storage medium or a display section (neither is shown) by way of the video interface section 10.

The image capture device of this preferred embodiment actually further includes an electronic shutter, a viewfinder, a power supply (or battery), a flashlight and other known components. However, the description thereof will be omitted herein because none of them are essential components that would make it difficult to understand how the present invention works unless they were described in detail. It should also be noted that this configuration is just an example. Rather, the present invention may also be carried out as any other appropriate combination of known elements except the solid-state image sensor 1.

Figure 2:
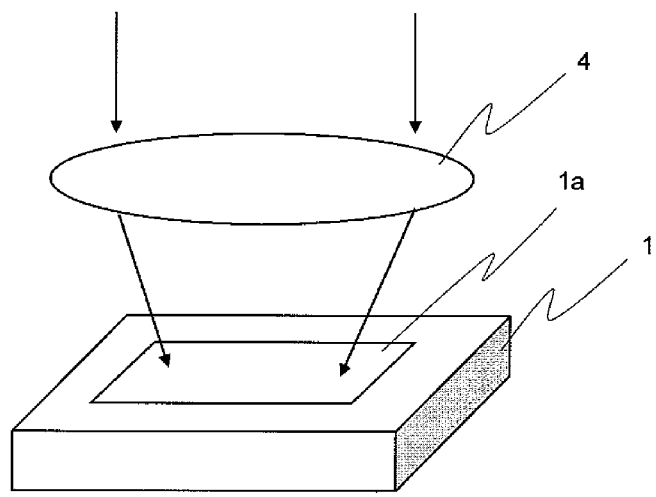
FIG. 2 is a block diagram illustrating how a lens and a solid-state image sensor are arranged in the first preferred embodiment of the present invention.

FIG. 2 schematically illustrates how the light that has been transmitted through the optical lens 4 is incident on the image sensor 1 during an exposure process. In FIG. 2, shown are only the optical lens 4 and the image sensor 1 with illustration of the other components omitted for the sake of simplicity. Also, although the lens 4 actually often consists of a number of lenses that are arranged in the optical axis direction, the lens 4 shown in FIG. 2 is illustrated as a single lens in a simplified form. On the imaging area 1a of the image sensor 1, arranged two-dimensionally are a number of pixels that form an array of pixels. Those pixels are typically photodiodes, each of which outputs, as a pixel signal, a photoelectrically converted signal representing the intensity of the light received (which will be referred to herein as an "incident light intensity"). The light that has been transmitted through the optical system 11 is incident on the imaging area 1a.

Figure 3A:
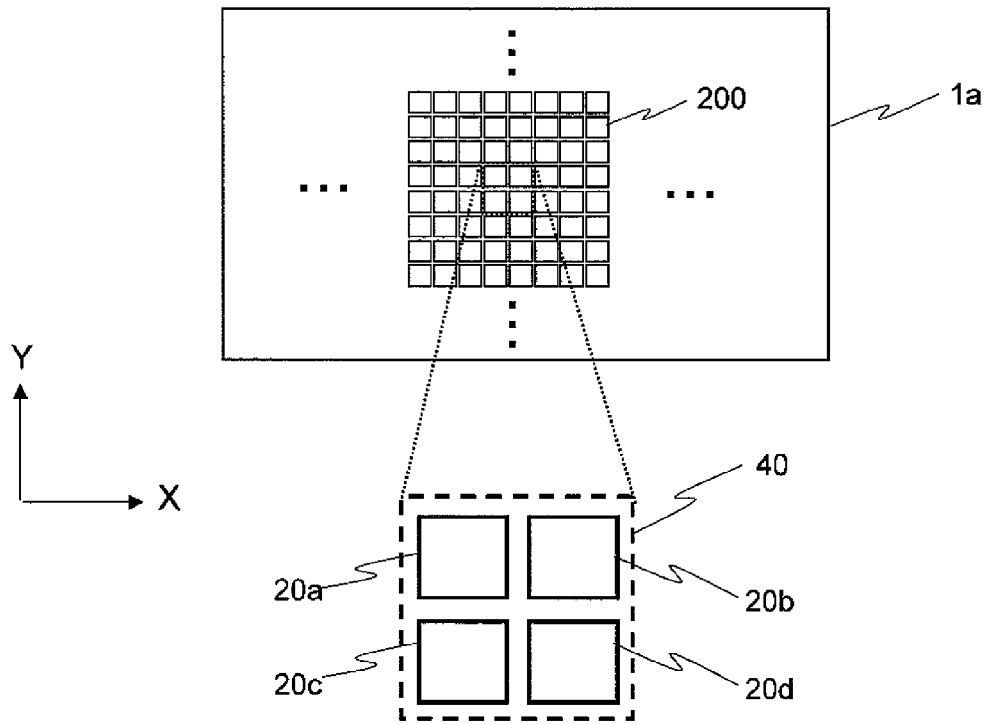
FIG. 3A illustrates an exemplary arrangement of pixels according to the first preferred embodiment of the present invention.
Figure 3B:
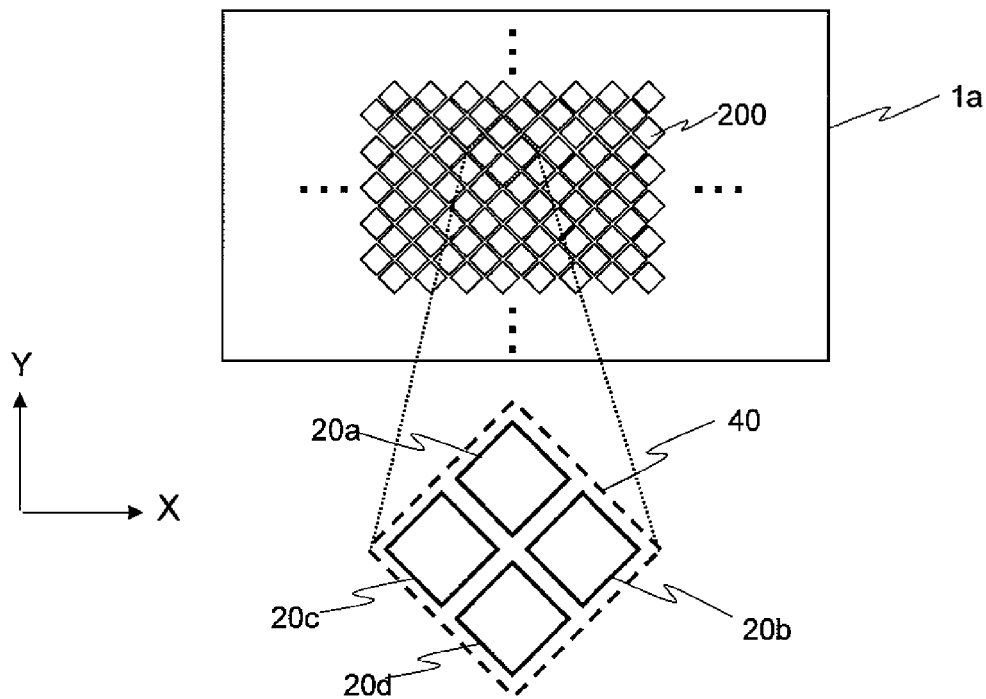
FIG. 3B illustrates another exemplary arrangement of pixels according to the first preferred embodiment of the present invention.

FIG. 3A is a plan view illustrating an arrangement of pixels according to a preferred embodiment of the present invention. As shown in FIG. 3A, an array of pixels 200 may be made up of a number of pixels that are arranged on the imaging area 1a to form a tetragonal lattice. The array of pixels 200 is divided into a number of unit pixel blocks 40, each of which consists of four pixels 20a, 20b, 20c and 20d that are arranged in two columns and two rows. Optionally, in an alternative preferred embodiment of the present invention, the pixels may also have an oblique lattice arrangement as shown in FIG. 3B, instead of the tetragonal lattice arrangement shown in FIG. 3A, or any other appropriate arrangement. Broadly speaking, the pixels may be arranged in any form as long as they are arranged two-dimensionally in a first direction and in a second direction that intersects with the first direction. In the following description, the pixel arrangement shown in FIG. 3A is supposed to be adopted. However, even if the pixel arrangement shown in FIG. 3B is adopted, for example, the same effect will also be achieved by appropriately changing the directions of ND filters (to be described later) and the directions of shifting the image. Also, in the following description, the XY coordinates shown in FIGS. 3A and 3B will be used, and the X and Y directions will be referred to herein as a "horizontal direction" and a "vertical direction", respectively, for convenience sake.

With such an arrangement, the incoming light is transmitted through the optical lens 4, the optical glass plate 3 and the optical low-pass filter 2, imaged on the imaging area 1a of the solid-state image sensor 1, and then photoelectrically converted by respective pixels of the solid-state image sensor 1. In this case, the optical low-pass filter 2 produces a birefringence of one pixel on the incoming light in the vertical direction of the image, thus decreasing the resolution in that direction. According to this preferred embodiment, the array of pixels 200 of the solid-state image sensor has a basic arrangement consisting of 2 by 2 pixels, each of which is provided with an ND (neutral density) filter that faces that pixel. Although those ND filters are arranged separately from each other in this preferred embodiment, those filters may also be combined into a single filter layer that faces the array of pixels 200. Anyway, according to the present invention, a number of light-transmitting portions have only to be provided so that each of those light-transmitting portions faces an associated one of the pixels. As used herein, if "something is associated with another thing", it means that those things face each other when a signal starts being accumulated. In this preferred embodiment, each ND filter functions as a single light transmitting section.

FIG. 4 illustrates a basic pixel arrangement and signal distributions for the solid-state image sensor 1 of this preferred embodiment. As shown in portion (a) of FIG. 4, ND filters 30a, 30b, 30c and 30d are respectively provided for the pixels 20a, 20b, 20c and 20d with an aperture ratio of 100% so that each of those filters 30a through 30d faces an associated one of the pixel 20a through 20d. And each of the ND filters 30a through 30d is made up of four areas, each of which has a width that is one-fourth of one pixel pitch (a) in the horizontal direction. In the ND filters 30a, 30b and 30c, each of the four areas thereof is either an area with a relatively high optical transmittance (which will be referred to herein as an "L (light colored area)") or an area with a relatively low optical transmittance (which will be referred to herein as a "D (dark colored area)"). Specifically, the optical transmittances of the ND filter 30a have a striped arrangement pattern in which D, L, D and L areas are arranged in this order from left to right in FIG. 4. The optical transmittances of the ND filter 30b have a striped arrangement pattern in which L, D, D and L areas are arranged in this order from left to right. The optical transmittances of the ND filter 30c have a striped arrangement pattern in which L, L, D and D areas are arranged in this order from left to right. But the ND filter 30d has no striped pattern and its four areas have the same optical transmittance. Supposing the optical transmittances of the L and D areas are represented by $\alpha$ (where $\alpha > 0$) and $\beta$ (where $0 < \beta < \alpha$), respectively, the optical transmittance of the ND filter 30d with no striped pattern is set to be $(\alpha+\beta)/2$. As a result, the quantities of light to be transmitted through these four ND filters are approximately equal to each other.

Hereinafter, the arrangement pattern of optical transmittances in an ND filter according to this preferred embodiment will be described. Such a dark- and light-colored pattern is produced based on an orthogonal wavelet transform coefficient that is defined by the Haar base scaling function u(t) shown in FIG. 9A and the Haar base wavelet function v(t) shown in FIG. 9B. According to this preferred embodiment, four items of data provided by four pixels need to be handled per unit pixel block. With the orthogonal wavelet transform, a given group of data may be transformed into a different group of data by performing additions or subtractions on the former group, or the latter group of data may be restored into the former group of data by performing the same arithmetic operations in reverse order. In this specific preferred embodiment, if the L areas and the non-striped areas are represented by "1" and if the D areas are represented by "−1", then the pattern components of these ND filters 30a, 30b, 30c and 30d may be represented by (−1, 1, −1, 1), (1, −1, −1, 1), (1, 1, −1, −1), and (1, 1, 1, 1), respectively. Their orthogonality can be confirmed by performing the same processing as when the inner product of vectors is calculated. That is to say, if each of these ND filters is supposed to be a vector consisting of four components, then their inner product becomes equal to zero, and it can be seen that they are orthogonal to each other.

Hereinafter, it will be described how the image capturing operation is performed according to this preferred embodiment.

Once the exposure process is started, a signal representing the quantity of the light received will be accumulated in respective pixels for a certain amount of time. Then, the accumulated signal is read out from the image sensor 1, passed through the signal generating and receiving section 5, and then sent to the image memory section 8. Next, the optical system driving section 7 subtly moves the transparent glass plate 3 perpendicularly to the optical axis (i.e., in the horizontal direction on the image), thereby shifting the image on the imaging area by one pixel pitch in the horizontal direction. After the image has been shifted in this way, the signal will be accumulated again in the respective pixels for the same amount of time. Next, the accumulated signal is read out from the image sensor 1 once again and then sent to the image memory section 8. In this case, the optical low-pass filter 2 does decrease the resolution in the vertical direction of the image but does not affect the horizontal resolution at all.

Hereinafter, pixel signals to be read will be described with reference to portions (b) through (d) of FIG. 4. First of all, look at the ND filters 30b and 30d. As the optical low-pass filter 2 is provided, the quantities of light rays that are entering these ND filters 30b and 30d are supposed to be the same.

Portion (b) of FIG. 4 shows a curve 19a indicating what degrees of horizontal dependence the signals to be accumulated in the pixels 20b and 20c would have were it not for the ND filters. In the following example, signals representing the quantities of light rays that enter the respective areas, of which the width is one fourth of one pixel pitch, are identified by X1, X2, X3, . . . and Xn. Portion (b) of FIG. 4 also shows a curve 19b indicating what degree of horizontal dependence the signals to be accumulated in the pixels 20a and 20c will have after the image has been shifted horizontally by one pixel pitch.

Hereinafter, it will be described what processing the video signal generating section 9 performs based on the pixel signals that have been obtained from the respective pixels.

First of all, while the image has not been shifted yet (i.e., while it is a still image), photoelectrically converted signals are read through the ND filters 30b and 30d. As shown in portion (c) of FIG. 4, the transmittances at the two outer areas of the ND filter 30b both $\alpha$, while the transmittances at the two inner areas thereof is $\beta$. That is why the signal Sb read out from the pixel 20b that faces the ND filter 30b is represented by $\alpha(X1+X4)+\beta(X2+X3)$. On the other hand, the signal Sd obtained through the ND filter 30d is represented by $(X1+X2+X3+X4)(\alpha+\beta)/2$.

Next, the image is horizontally shifted to the left by one pixel pitch and photoelectrically converted pixel signals are read out through the ND filters 30a and 30c. As shown in portion (d) of FIG. 4, the signal Sa obtained through the ND filter 30a is represented by $\alpha(X2+X4)+\beta(X1+X3)$. On the other hand, the signal Sc obtained through the ND filter 30c is represented by $\alpha(X1+X2)+\beta(X3+X4)$. That is to say, these signals Sa through Sd are calculated by the following Equations (1) through (4), respectively:

$$Sa = \alpha(X2+X4)+\beta(X1+X3) \quad (1)$$

$$Sb = \alpha(X1+X4)+\beta(X2+X3) \quad (2)$$

$$Sc = \alpha(X1+X2) + \beta(X3+X4) \quad (3)$$

$$Sd = (X1+X2+X3+X4)(\alpha+\beta)/2 \quad (4)$$

Thereafter, these signals are subjected to the following processing. First, Sd is divided by 2 ($\alpha+\beta$). Next, subtractions are carried out on Sd and the other signals and each remainder is divided by 2($\alpha-\beta$). By performing these arithmetic operations, signals Y1, Y2, Y3 and Y4 represented by the following Equations (5) through (8), respectively, are obtained:

$$Y1 = Sd/2(\alpha+\beta) \quad (5)$$

$$Y2 = (Sc-Sd)/2(\alpha-\beta) \quad (6)$$

$$Y3 = (Sd-Sa)/2(\alpha-\beta) \quad (7)$$

$$Y4 = (Sb-Sd)/2(\alpha-\beta) \quad (8)$$

As a result, the relations between Y1 through Y4 and X1 through X4 are represented by the following Equations (9) through (12), respectively:

$$Y1 = (X1+X2+X3+X4)/4 \quad (9)$$

$$Y2 = (X1+X2-X3-X4)/4 \quad (10)$$

$$Y3 = (X1+X2+X3+X4)/4 \quad (11)$$

$$Y4 = (X1-X2+X3+X4)/4 \quad (12)$$

It can be said that the signals (Y1, Y2, Y3, Y4) obtained by subjecting the signals supplied from the ND filters 30a through 30d to these arithmetic operations are wavelet-transformed signals. And if these results are subjected to the same set of additions and subtractions in reverse order, the original signals (X1, X2, X3, X4) can be obtained. That is to say, by performing the additions and subtractions represented by the following Equations (13) through (16), the pixel signals X1 through X4 to be obtained from the respective areas, of which the width is one fourth of one pixel pitch, can be calculated:

$$X1 = Y1+Y2+Y3+Y4 \quad (13)$$

$$X2 = Y1+Y2-Y3-Y4 \quad (14)$$

$$X3 = Y1-Y2+Y3-Y4 \quad (15)$$

$$X4 = Y1-Y2-Y3+Y4 \quad (16)$$

It should be noted that these signal arithmetic operations are just an example. Rather, the arithmetic operations could be carried out in any other procedure as long as the signals X1 through X4 can be obtained.

As described above, the image capture device of this preferred embodiment uses four different kinds of ND filters, which are provided for four pixels of the solid-state image sensor 1 so as to face the pixels one to one and which have mutually different arrangement patterns of optical transmittances, thereby increasing the horizontal resolution substantially fourfold. In this case, each of the three out of those four kinds of ND filters has been divided into four areas, of which the width is one fourth of the horizontal pixel pitch. Specifically, the first ND filter 30a has a (D, L, D, L) striped pattern, the second ND filter 30b has a (L, D, D, L) striped pattern, and the third ND filter 30c has a (L, L, D, D) striped pattern. On the other hand, the fourth ND filter 30d does not have such a striped pattern but has a uniform transmittance. If the image is horizontally shifted by one pixel pitch across these striped patterns and if the image yet to be shifted and the shifted image are captured, then pixel signals can be obtained from those four areas, each of which has a width that is one fourth of one pixel pitch. That is to say, as pixel signals can be obtained with a subpixel precision, the resolution can be increased much more significantly than in the prior art.

In the preferred embodiment described above, each pixel is supposed to have an aperture ratio of 100%. However, this is just an example and the aperture ratio may naturally be less than 100%. The same effect will be achieved if the signals are corrected according to the aperture ratio of each of those pixels.

It should be noted that according to the present invention, the arrangement patterns of optical transmittances in the respective ND filters do not have to be the ones that have been described above. Alternatively, the arrangement pattern of optical transmittances in any ND filter may also be contrary to the one that has already been described. As used herein, if the pattern is "contrary", then it means that the combination of L and D areas with transmittances $\alpha$ and $\beta$ in the contrary pattern is reverse to that of the given pattern. For example, the patterns shown in portion (a) of FIG. 4 may be replaced with the ones shown in FIG. 5, which illustrates an example in which the ND filters 30a, 30b, and 30c are respectively replaced with ND filters 30e, 30f, and 30g with reversed shades. Even with this arrangement, the same result will be obtained by reversing $\alpha$ and $\beta$ in the signal arithmetic operations described above. Although the shades of three ND filters are reversed in this example, only one ND filter or two may have its/their shade reversed, too.

As for the ND filter-pixel combination, one pixel is associated with one ND filter in the preferred embodiment described above. However, there is no problem even if multiple pixels are associated with a single ND filter. For example, two pixels may be associated with one ND filter. FIG. 6 illustrates such an example in which two pixels 20a and 20b are associated with one ND filter 30h. In this case, the ND filter 30h is arranged so as to cover the two pixels 20a and 20b. The ND filter 30h is divided into four areas, each of which has a width that is one fourth of one pixel pitch as measured in the X direction. The arrangement pattern of optical transmittances of this ND filter 30h is represented by (D, L, L, D). Signals representing the respective intensities of these four areas can be calculated based on two pixel signals that are obtained from the two pixels 20a and 20b. In this example, the resolution in the X direction is a half of the normal resolution. Also, in this example, the two halves of the ND filter 30h that respectively face these two pixels 20a and 20b function as two different light-transmitting portions. That is why the ND filter 30h is arranged so that their portions that face the pixels 20a and 20b have mutually different arrangement patterns of optical transmittances.

Also, although the optical image is supposed to be shifted by moving the transparent glass plate 3 in the preferred embodiment described above, the image may also be shifted by a different method. That is to say, according to the present invention, any other means may be used as long as those members are arranged so as to change the relative position of the optical image with respect to multiple light-transmitting portions. For example, the image can also be shifted even by arranging a transparent glass plate with a uniform thickness that is tilted with respect to the optical axis and by subtly moving that glass plate. Thus, the same effect can be achieved even by slightly moving such a light-transmissive member, of which the surface is tilted with respect to a plane that intersects with the optical axis at right angles. The same effect can also be achieved through signal processing even if the image and the image sensor 1 are fixed but if every ND filter is moved horizontally by one pixel pitch. In such an arrangement in which the ND filters are subtly moved, the sensor driving section 6 may have a mechanism for slightly moving the ND filters.

In the preferred embodiment described above, the optical transmittance of the fourth ND filter 30d is set to be $(\alpha+\beta)/2$ in order to substantially equalize the quantities of light rays striking the respective pixels. However, it is not always necessary to adopt this setting. Unless the optical transmittances of the four areas of the fourth ND filter 30d are zero, the same effect can be achieved through signal arithmetic operations, no matter what optical transmittances the ND filter 30d has.

According to this preferred embodiment, the horizontal resolution can be four times as high as the normal one, but the vertical resolution decreases to one half of the normal one because the optical low-pass filter 2 is used. Thus, to minimize the decrease in vertical resolution, the vertical pixel pitch may be a half of the normal one. Then, the vertical resolution can be kept approximately as high as the normal resolution even if the optical low-pass filter 2 is used.

(Embodiment 2)

Hereinafter, an image capture device according to a second preferred embodiment of the present invention will be described with reference to FIG. 7. The image capture device of this second preferred embodiment has the same arrangement as the counterpart of the first preferred embodiment described above except the configuration of the ND filters. Thus, the following description of the second preferred embodiment will be focused on only that difference from the image capture device of the first preferred embodiment and their common features will not be described all over again to avoid redundancies.

FIG. 7 illustrates a basic pixel arrangement and signal distributions for the solid-state image sensor 1 of this preferred embodiment. As shown in portion (a) of FIG. 7, ND filters 30a, 30b, 30c and 30e are arranged in stripes for the pixels with an aperture ratio of 100% so that each of those filters 30a through 30d faces an associated one of the pixels. In this preferred embodiment, the ND filter arrangement of the first preferred embodiment (see FIG. 4) is partially changed so that an ND filter 30e, of which the pattern is contrary to that of the ND filter 30a, replaces the ND filter 30d and faces the pixel 20d. In addition, according to this preferred embodiment, the optical transmittances of these shaded patterns are set so that the D portions have a very low optical transmittance (i.e., $\beta \approx 0$), while the L portions have a very high optical transmittance (i.e., $\alpha \approx 1$). In this manner, the overall quantity of light transmitted is substantially equalized in every ND filter.

Hereinafter, it will be described how the image capturing operation is performed according to this preferred embodiment.

Once the exposure process is started for the purpose of image capturing, the transparent glass plate 3 is subtly moved perpendicularly to the optical axis (i.e., in the horizontal direction on the image), thereby shifting the image on the imaging area in the horizontal direction. In this case, the optical low-pass filter 2 does decrease the resolution in the vertical direction of the image but does not affect the horizontal resolution at all. In this preferred embodiment, the image is horizontally shifted to three different positions by one pixel pitch, 5⁄4 pitches and 3⁄2 pitches, respectively, from its original position in still state. And every time the image is shifted, image signals are generated by photoelectric conversion and read out from the solid-state image sensor 1.

Hereinafter, pixel signals to be read will be described with reference to portions (b) through (f) of FIG. 7. In this preferred embodiment, the optical transmittances in the D and L areas are supposed to be 0% and 100%, respectively. That is to say, $\alpha=1$ and $\beta=0$. First of all, look at the ND filters 30b and 30e. As the optical low-pass filter 2 is provided, the quantities of light rays that are entering these ND filters 30b and 30e are supposed to be the same.

Portion (b) of FIG. 7 shows a curve 19a indicating what degrees of horizontal dependence the signals to be accumulated in the pixels 20b and 20e would have were it not for the ND filters. Portion (b) of FIG. 7 also shows curves 19b, 19c and 19d indicating what degrees of horizontal dependence the signals to be accumulated in the pixels 20a and 20e will have after the image has been shifted horizontally by one pixel pitch, 5⁄4 pitches and 3⁄2 pitches, respectively.

Hereinafter, it will be described what processing the video signal generating section 9 performs based on the pixel signals that have been obtained from the respective pixels.

First of all, while the image has not been shifted yet (i.e., while it is a still image), photoelectrically converted signals are read through the ND filters 30b and 30e. As shown in portion (c) of FIG. 7, the signals obtained through the ND filters 30b and 30e are represented by (X1+X4) and (X1+X3), respectively. Next, the image is horizontally shifted by one pixel pitch and photoelectrically converted pixel signals are read out through the ND filters 30a and 30c. As shown in portion (d) of FIG. 7, the signals obtained through the ND filters 30a and 30c are represented by (X2+X4) and (X1+X2), respectively. Subsequently, the image is horizontally shifted by 5⁄4 pixel pitches from its original position in still state and photoelectrically converted pixel signals are read out through the ND filters 30a and 30c. As shown in portion (e) of FIG. 7, the signals obtained through the ND filters 30a and 30c are represented by (X3+X5) and (X2+X3), respectively. Thereafter, the image is horizontally shifted by 3⁄2 pixel pitches from its original position in still state and photoelectrically converted pixel signals are read out through the ND filters 30a and 30c. As shown in portion (f) of FIG. 7, the signals obtained through the ND filters 30a and 30c are represented by (X4+X6) and (X3+X4), respectively.

All of the signals that have been read but (X3+X5) and (X4+X6) are used. Specifically, the signal (X1+X3) obtained through the ND filter 30e and the signal (X2+X4) that was obtained through the ND filter 30a when the image was shifted by one pixel pitch are added together, thereby calculating (X1+X2+X3+X4) as Y1 as represented by the following Equation (17). After that, subtractions are carried out on the respective signals by the following Equations (18) to (20):

$$Y1=(X1+X2+X3+X4) \quad (17)$$

$$Y2=(X1+X2)-(X3+X4) \quad (18)$$

$$Y3=(X1+X3)-(X2+X4) \quad (19)$$

$$Y4=(X1+X4)-(X2+X3) \quad (20)$$

The signals Y1, Y2, Y3 and Y4 obtained by performing these arithmetic operations may be the same as their counterparts of the first preferred embodiment described above except the coefficients. It can be said that (Y1, Y2, Y3, Y4) are wavelet transformed signals. And if these results are subjected to the same set of arithmetic operations in reverse order, the original signals (X1, X2, X3, X4) can be obtained. That is to say, by performing the arithmetic operations represented by the following Equations (21) through (24), the pixel signals X1 through X4 to be obtained from the respective areas, of which the width is one fourth of one pixel pitch, can be calculated:

$$X1=(Y1+Y2+Y3+Y4)/4 \quad (21)$$

$$X2=((Y1+Y2)-(Y3+Y4))/4 \quad (22)$$

$$X3=((Y1+Y3)-(Y2+Y4))/4 \quad (23)$$

$$X4=((Y1+Y4)-(Y2+Y3))/4 \quad (24)$$

It should be noted that these signal arithmetic operations are just an example. Rather, the arithmetic operations could be carried out in any other procedure as long as the signals X1 through X4 can be obtained.

As described above, the image capture device of this preferred embodiment uses four different kinds of ND filters, which are provided for four pixels of the solid-state image sensor 1 so as to face the pixels one to one and which have mutually different arrangement patterns of optical transmittances, thereby increasing the horizontal resolution substantially fourfold. In this case, each of those ND filters has been divided into four areas, of which the stripe width is one fourth of the horizontal pixel pitch. Specifically, the first ND filter 30a has a (D, L, D, L) striped pattern, the second ND filter 30b has a (L, D, D, L) striped pattern, the third ND filter 30c has a (L, L, D, D) striped pattern, and the fourth ND filter 30d has a (L, D, L, D) striped pattern. If the image is horizontally shifted from its initial position by one pixel pitch, ⁵⁄₄ pixel pitches and then ³⁄₂ pixel pitches, respectively, across these striped patterns and if the image yet to be shifted and the shifted images are captured, then pixel signals can be obtained from those four areas, each of which has a width that is one fourth of one pixel pitch. That is to say, as pixel signals can be obtained with a subpixel precision, the resolution can be increased much more significantly than in the prior art.

In the preferred embodiment described above, the L areas are supposed to have a transmittance of 100% and the D areas are supposed to have a transmittance of 0%. However, these transmittances do not always have to be used because the arithmetic operations described above can be done approximately as defined by those equations if the difference in shade is sufficiently big.

It should be noted that according to the present invention, the arrangement patterns of optical transmittances in the respective ND filters do not have to be the ones that have been described above. Alternatively, the arrangement pattern of optical transmittances in any ND filter may also be contrary to the one that has already been described. Nevertheless, according to this preferred embodiment, the arrangement pattern of the ND filter 30e needs to be contrary to that of the ND filter 30a.

As in the preferred embodiment described above, in shifting the image slightly, it is not always necessary to move the transparent glass plate 3 subtly but any other method may be adopted as well. For example, the image can also be shifted even by arranging a transparent glass plate with a uniform thickness that is tilted with respect to the optical axis and by subtly moving that glass plate. Thus, the same effect can be achieved even by slightly moving such a light-transmissive member, of which the surface is tilted with respect to a plane that intersects with the optical axis at right angles. The same effect can also be achieved even if the image and the image sensor 1 are fixed but if every ND filter is moved horizontally by one pixel pitch.

(Embodiment 3)

Hereinafter, an image capture device according to a third preferred embodiment of the present invention will be described. The image capture device of this third preferred embodiment has the same arrangement, and performs the same signal reading process, as its counterpart of the second preferred embodiment described above but different signals are obtained as a result of the arithmetic operations. Thus, the following description of the third preferred embodiment will be focused on only that difference from the image capture device of the second preferred embodiment and their common features will not be described all over again to avoid redundancies.

According to this preferred embodiment, the feature of an image is supposed to be represented by a variation in pixel value and an AC signal is calculated every one fourth pixel pitch. That is to say, the respective pixel signals are calculated with the DC component supposed to be zero. Thus, the signals X1 through X4 are calculated on the supposition that Y1=0. By performing such processing, pixel signals that are not affected by DC components can be obtained. Specifically, if the respective pixel signals are calculated by substituting Y1=0 into Equations (21) through (24), AC signals X1 through X4 can be obtained every one fourth pixel pitch as represented by the following Equations (25) through (28):

$$X1=(Y2+Y3+Y4)/4 \quad (25)$$

$$X2=(Y2-Y3-Y4)/4 \quad (26)$$

$$X3=(Y3-Y2-Y4)/4 \quad (27)$$

$$X4=(Y4-Y2-Y3)/4 \quad (28)$$

As described above, the image capture device of this preferred embodiment uses four different kinds of ND filters, which are provided for four pixels of the solid-state image sensor 1 so as to face the pixels one to one and which have mutually different arrangement patterns of optical transmittances, thereby increasing the horizontal resolution substantially fourfold. In this case, each of those ND filters has been divided into four areas, of which the stripe width is one fourth of the horizontal pixel pitch. Specifically, the first ND filter 30a has a (D, L, D, L) striped pattern, the second ND filter 30b has a (L, D, D, L) striped pattern, the third ND filter 30c has a (L, L, D, D) striped pattern, and the fourth ND filter 30d has a (L, D, L, D) striped pattern. The image is horizontally shifted from its initial position by one pixel pitch, ⁵⁄₄ pixel pitches and then ³⁄₂ pixel pitches, respectively, across these striped patterns and the image yet to be shifted and the shifted images are captured. According to this preferred embodiment, by setting the DC component signal to be zero during the signal processing, AC pixel signals can be obtained from the respective areas, each of which has a width that is one fourth of one pixel pitch. As a result, an image with a higher resolution than conventional ones can be obtained even for those AC components.

(Embodiment 4)

Hereinafter, an image capture device according to a fourth preferred embodiment of the present invention will be described with reference to FIG. 8. The image capture device of this fourth preferred embodiment uses the same arrangement patterns for the respective areas of the light-transmitting portions as its counterpart of the second preferred embodiment described above but the optical transmittances in the shaded portions of those ND filters, the way of shifting the optical image, and the signal processing method are different from those of the second preferred embodiment described above. Thus, the following description of the fourth preferred embodiment will be focused on only that difference from the image capture device of the second preferred embodiment and their common features will not be described all over again to avoid redundancies.

As for the optical transmittances in the shaded portions of the ND filters, the optical transmittances in the L and D areas are set to be $\alpha$ and $\beta$ (where $\alpha>0$ and $0<\beta<\alpha$), respectively, as in the first preferred embodiment described above. The way of shifting the optical image and the image capturing process are the same as the ones used in the first preferred embodiment. That is to say, the image produced on the imaging area is horizontally shifted from its original position in still state by one pixel pitch and the pixel signals that have been subjected to photoelectric conversion before and after the image is shifted are read out from the solid-state image sensor 1.

Hereinafter, it will be described with reference to FIG. 8 exactly what pixel signals are read out. FIG. 8 illustrates a basic pixel arrangement and signal distributions for the solid-state image sensor 1 of this preferred embodiment.

First of all, while the image has not been shifted yet (i.e., while it is a still image), photoelectrically converted signals are read in this preferred embodiment through the ND filters 30b and 30e. As shown in portion (c) of FIG. 8, the signals Sb and Se obtained through the ND filters 30b and 30e are represented by a $(X1+X4)+\beta(X2+X3)$ and a $(X1+X3)-\beta(X2+X4)$, respectively. Next, the image is horizontally shifted to the left by one pixel pitch and photoelectrically converted pixel signals are read out through the ND filters 30a and 30e. As shown in portion (d) of FIG. 8, the signals Sa and Sc obtained through the ND filters 30a and 30c are represented by $\alpha(X2+X4)+\beta(X1+X3)$ and $\alpha(X1+X2)+\beta(X3+X4)$, respectively. Consequently, the signals Sa, Sb and Sc are calculated by Equations (1) through (3), respectively, while the signal Se is represented by the following Equation (29):

$$Se=\alpha(X1+X3)+\beta(X2+X4) \quad (29)$$

By solving the simultaneous equations using Equations (1) and (25), (X1+X3) and (X2+X4) are obtained by the following Equations (30) and (31):

$$(X1+X3)=(\alpha Se-\beta Sa)/(\alpha^2-\beta^2) \quad (30)$$

$$(X2+X4)=(\alpha Sa-\beta Se)/(\alpha^2-\beta^2) \quad (31)$$

Furthermore, by modifying these Equations (30) and (31), X3 is represented by X1 and other terms and X4 is represented by X2 and other terms as in the following Equations (32) and (33):

$$X3=(\alpha Se-\beta Sa)/(\alpha^2-\beta^2)-X1 \quad (32)$$

$$X4=(\alpha Sa-\beta Se)/(\alpha^2-\beta^2)-X2 \quad (33)$$

Next, by substituting X3 and X4 into Equations (2) and (3), X1 and X2 are obtained as represented by the following Equations (34) and (35), respectively. On the other hand, X3 and X4 are calculated by the following Equations (36) and (37), respectively:

$$X1=(-(\alpha+2\beta)Sa+(\alpha+\beta)(Sb+Sc)-\beta Se)/2(\alpha^2-\beta^2) \quad (34)$$

$$X2=((\alpha+2\beta)Sa-(\alpha+\beta)(Sb-Sc)+\beta Se)/2(\alpha^2-\beta^2) \quad (35)$$

$$X3=(\alpha Sa-(\alpha+\beta)(Sb+Sc)+(2\alpha+\beta)Se)/2(\alpha^2-\beta^2) \quad (36)$$

$$X4=((\alpha-2\beta)Sa+(\alpha+\beta)(Sb-Sc)-3\beta Se)/2(\alpha^2-\beta^2) \quad (37)$$

As described above, by shifting the image horizontally by one pixel pitch using the ND filter arrangement shown in portion (a) of FIG. 8, a high-definition image signal representing an image, of which the horizontal pixel pitch is one fourth of the normal one, can be obtained. It should be noted that these signal arithmetic operations are just an example. Rather, the arithmetic operations could be carried out in any other procedure as long as the signals X1 through X4 can be obtained.

As described above, the image capture device of this preferred embodiment uses four different kinds of ND filters, which are provided for four pixels of the solid-state image sensor 1 so as to face the pixels one to one and which have mutually different arrangement patterns of optical transmittances, thereby increasing the horizontal resolution substantially fourfold. In this case, each of those ND filters has been divided into four areas, of which the stripe width is one fourth of the horizontal pixel pitch. Specifically, the first ND filter 30a has a (D, L, D, L) striped pattern, the second ND filter 30b has a (L, D, D, L) striped pattern, the third ND filter 30c has a (L, L, D, D) striped pattern, and the fourth ND filter 30d has a (L, D, L, D) striped pattern. If the image is horizontally shifted by one pixel pitch across these striped patterns and if the image yet to be shifted and the shifted images are captured, then pixel signals can be obtained from those four areas, each of which has a width that is one fourth of one pixel pitch. That is to say, as pixel signals can be obtained with a subpixel precision, the resolution can be increased much more significantly than in the prior art.

In the first through fourth preferred embodiments of the present invention described above, each ND filter is supposed to be divided into four striped areas that have the same width in the X direction. However, the effects of the present invention can also be achieved even if these four areas have different widths. In that case, the respective signals just need to be corrected with a difference in the quantity of the light transmitted, which should be caused by the difference in width between those areas, taken into account.

According to the present invention, the arrangement patterns of optical transmittances of the respective light-transmitting portions do not have to be the ND filter patterns that have been adopted in the first through fourth preferred embodiments of the present invention described above. Rather the optical transmittances of the respective light-transmitting portions may have any other arrangement pattern as long as signals representing the quantities of light rays entering the respective areas of each light-transmitting portion can be obtained. Furthermore, the number of areas per light-transmitting portion does not have to be four, either. Broadly speaking, according to the present invention, each unit pixel block just needs to include N pixels (where N is an integer that is equal to or greater than two) and each light-transmitting portion has only to be divided into M areas (where M is an integer that is equal to or greater than two).

Furthermore, in the preferred embodiments described above, the optical transmittances of the respective areas of each ND filter are set to be $\alpha$, $\beta$ or $(\alpha+\beta)/2$. However, this is only an example and the present invention is in no way limited to those specific preferred embodiments. Rather according to the present invention, even if all of those areas of each light-transmitting portion have mutually different optical transmittances but if those optical transmittances are known, signals representing the transmittances of those areas can also be obtained by performing signal arithmetic operations.

In the preferred embodiments of the present invention described above, the vertical resolution is decreased, and the image is shifted horizontally, by using the optical low-pass filter 2 of quartz crystal, thereby increasing only the horizontal resolution. However, this measure is taken just to reduce the number of times of shifting the image. Thus, if the image should be slightly shifted vertically, too, the optical low-pass filter 2 does not have to be used. Even if the optical low-pass filter 2 is not used and if the image is shifted both horizontally and vertically alike, the same effects as the ones that have already been described for the first through fourth preferred embodiments of the present invention can also be achieved. Furthermore, each light-transmitting portion is not always divided into those areas that are arranged in line horizontally but could also be divided into multiple areas that are arranged in line vertically. If the arrangement pattern of the optical transmittances in each light-transmitting portion is such a two-dimensional one, the resolution can be increased not just horizontally but also vertically as well.

Industrial Applicability

The image capture device and solid-state image sensor of the present invention can be used effectively in every camera that uses a solid-state image sensor, and may be used in digital still cameras, digital camcorders and other consumer electronic cameras and in industrial surveillance cameras, to name just a few.

Reference Signs List 1 solid-state image sensor
1a imaging area of solid-state image sensor
2 optical low-pass filter
3 transparent glass plate
4 optical lens
5 signal generating and receiving section
6 sensor driving section
7 optical system driving section
8 image memory section
9 video signal generating section
10 video interface section
11 optical system
19a, 19b, 19c, 19d pixel signal
20a, 20b, 20c, 20d pixel
30a, 30b, 30c, 30d, 30e, 30f, 30g, 30h, 30i ND filter (light-transmitting portion)
40 unit pixel block
100 image capturing section
200 video signal processing section

The invention claimed is:

1. An image capture device comprising:
a solid-state image sensor including an array of pixels being made up of a number of pixels that are arranged two-dimensionally on an imaging area in a first direction and in a second direction that intersects with the first direction and is being divided into a number of unit pixel blocks, each of which is made up of N pixels (where N is an integer that is equal to or greater than two); and a number of light-transmitting portions, each of which is provided for an associated one of the pixels and includes M neutral density filters (where M is an integer that is equal to or greater than two) that are arranged in the first direction, the respective neutral density filters having had their optical transmittances set independently of each other, the arrangement patterns of the optical transmittances of N light-transmitting portions that are provided for N pixels included in each said unit pixel block varying from one light-transmitting portion to another;
an optical system configured to produce an image on the imaging area of the solid-state image sensor;
a shifting section configured to change the relative position of the image with respect to the light-transmitting portions in at least one of the first and second directions; and
a signal processing section configured to generate an image, of which the resolution is higher than the resolution that is defined by a pixel pitch of the array of pixels in the first direction, based on the output signals of respective pixels of the solid-state image sensor.

2. The image capture device of claim 1, wherein the optical system includes an optical low-pass filter for decreasing, in the second direction, the resolution of the image to be produced by the optical system, and
wherein the shifting section changes the relative position of the image with respect to the light-transmitting portions in the first direction.

3. The image capture device of claim 1, wherein the arrangement patterns of the optical transmittances of the N light-transmitting portions that are provided for the N pixels included in each said unit pixel block are determined by an orthogonal wavelet coefficient.

4. The image capture device of claim 1, wherein the optical system includes a light-transmissive member, one surface of which is tilted with respect to a plane that intersects with the optical axis at right angles, and
wherein the shifting section changes the relative position of the image with respect to the light-transmitting portions by moving the light-transmissive member perpendicularly to the optical axis.

5. The image capture device of claim 1, wherein each of the M neutral density filters in each of at least all but one of the N light-transmitting portions, which are provided for the N pixels included in each said unit pixel block, have had their optical transmittances set to be either a first transmittance or a second transmittance that is different from the first transmittance.

6. The image capture device of claim 5, wherein N=4 and M=4, and
wherein if the first and second transmittances are represented by "1" and "−1", respectively, the arrangement patterns of the optical transmittances of four light-transmitting portions that are provided for four pixels included in each said unit pixel block are selected from the group consisting of: a first pattern represented by "1, −1, 1, −1" and a contrary pattern thereof; a second pattern represented by "−1, 1, 1, −1" and a contrary pattern thereof; a third pattern represented by "−1, −1, 1, 1" and a contrary pattern thereof;
and a fourth pattern in which the optical transmittances of respective neutral density filters are set to be a third transmittance that is greater than zero.

7. The image capture device of claim 5, wherein N=4 and M=4, and
wherein if the first and second transmittances are represented by "1" and "−1", respectively, the arrangement patterns of the optical transmittances of four light-transmitting portions that are provided for four pixels included in each said unit pixel block are selected from the group consisting of: a first pattern represented by "1, −1, 1, −1", a second pattern represented by "31 1, 1, 1, −1" and a contrary pattern thereof; a third pattern represented by "−1, −1, 1, 1" and a contrary pattern thereof; and a contrary pattern of the first pattern.

8. A solid-state image sensor comprising:
an array of pixels being made up of a number of pixels that are arranged two-dimensionally on an imaging area in a first direction and in a second direction that intersects with the first direction and being divided into a number of unit pixel blocks, each of which is made up of N pixels (where N is an integer that is equal to or greater than two), and
a number of light-transmitting portions, each of which is provided for an associated one of the pixels and includes M neutral density filters (where M is an integer that is equal to or greater than two) that are arranged in the first direction, the respective neutral density filters having had their optical transmittances set independently of each other, the arrangement patterns of the optical transmittances of N light-transmitting portions that are provided for N pixels included in each said unit pixel block varying from one light-transmitting portion to another.

* * * * *